(12) United States Patent
Swiatkowski

(10) Patent No.: US 8,349,937 B2
(45) Date of Patent: Jan. 8, 2013

(54) CASTING RESIN SYSTEM FOR INSULATING MATERIALS IN SWITCH GEARS

(75) Inventor: Gernot Swiatkowski, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/148,721

(22) PCT Filed: Jan. 21, 2010

(86) PCT No.: PCT/EP2010/050682
§ 371 (c)(1),
(2), (4) Date: Aug. 10, 2011

(87) PCT Pub. No.: WO2010/091922
PCT Pub. Date: Aug. 19, 2010

(65) Prior Publication Data
US 2011/0313103 A1    Dec. 22, 2011

(30) Foreign Application Priority Data

Feb. 10, 2009  (DE) .......................... 10 2009 008 464

(51) Int. Cl.
*C08K 3/22* (2006.01)
(52) U.S. Cl. ........................................ 524/437; 524/430
(58) Field of Classification Search .................. 524/430, 524/437
See application file for complete search history.

(56) References Cited

U.S. PATENT DOCUMENTS

| | | |
|---|---|---|
| 4,559,272 A | 12/1985 | Oldham |
| 4,560,716 A * | 12/1985 | Sato et al. .................... 523/451 |
| 5,679,730 A | 10/1997 | Amano et al. |
| 5,965,637 A | 10/1999 | Pfander et al. |
| 6,001,483 A | 12/1999 | Harada et al. |
| 6,194,490 B1 | 2/2001 | Roth et al. |
| 6,528,595 B1 | 3/2003 | Ikawa et al. |
| 2003/0124378 A1* | 7/2003 | Konarski et al. .............. 428/620 |
| 2009/0192265 A1* | 7/2009 | Hasegawa et al. ............ 525/101 |

FOREIGN PATENT DOCUMENTS

| | | |
|---|---|---|
| CN | 1189847 A | 8/1998 |
| DE | 4434279 A1 | 3/1996 |
| DE | 19523897 A1 | 1/1997 |
| DE | 69609773 T2 | 12/2000 |
| DE | 69531191 T2 | 4/2004 |
| DE | 69921991 T2 | 11/2005 |
| WO | 8505215 A1 | 11/1985 |
| WO | 9943729 A1 | 9/1999 |

OTHER PUBLICATIONS

Bouillon et al., "Influence of different Imizadole Catalysts on Epoxy-Anhydride Copolymerization and on their Network Properties", Journal of Applied Polymer Science, John Wiley and Sons Inc. New York, vol. 38, No. 11, Dec. 5, 1989, pp. 2103-2113, XP000164633.

* cited by examiner

*Primary Examiner* — Peter Szekely
(74) *Attorney, Agent, or Firm* — Laurence A. Greenberg; Werner H. Stemer; Ralph E. Locher

(57) ABSTRACT

An insulating resin for switch gears on the basis of glycidyl ester contains methyl nadic anhydride/hydrogenated methyl nadic anhydride as hardener and an N-substituted imidazole as accelerator. Furthermore, platelet-shaped alumina is added as a filler. The resin has a substantially elevated glass transition temperature, while at the same time having a high mechanical level and being very tracking resistant. It is suitable as a casting resin in gas-insulated transmission line systems.

9 Claims, No Drawings

CASTING RESIN SYSTEM FOR INSULATING MATERIALS IN SWITCH GEARS

BACKGROUND OF THE INVENTION

Field of the Invention

The present invention relates to the field of insulating resins for switchgear, especially to those insulating resins used as casting resins for "gas-insulated lines" (GILs).

In electrical switchgear—especially in the case of compact design—the insulating composition plays an important role.

In these insulating resins, which are usually used in the form of casting resins, a high glass transition temperature is advantageous, but at the same time there frequently also exist high demands on favorable mechanical properties, high field strength and good tracking characteristics. Especially in the case of GILs, the tracking characteristics are often a crucial parameter; further requirements are high burst values and—if possible—a good resistance to decomposition products of gases such as $SF_6$.

BRIEF SUMMARY OF THE INVENTION

It is thus an object of the present invention to provide, as an alternative to the existing solutions, an insulating resin for switchgear, in which an increased glass transition temperature is discovered with, at the same time, good or even improved other properties, especially with regard to the tracking resistance.

This object is achieved by an insulating resin as claimed. Accordingly, an insulating resin based on glycidyl esters for insulating compositions in switchgear is proposed, formed from the starting components comprising:
  a) a material comprising methylnadic anhydride and/or hydrogenated methylnadic anhydride,
  b) a material comprising an imidazole of the following structure:

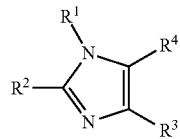

I where R1 is selected from the group comprising alkyl, long-chain alkyl, alkenyl, cycloalkyl, haloalkyl, aryl;

$R^2$, $R^3$, $R^4$ are each independently selected from the group comprising hydrogen, alkyl, long-chain alkyl, alkenyl, cycloalkyl, haloalkyl, aryl, where one or more nonadjacent CH2 groups in suitable radicals may each independently be replaced by —O—, —S—, —NH—, —NR°—, —SiR°R°°—, —CO—, —COO—, —OCO—, —OCO—O—, —SO2-, CN, —S—CO—, —CO—S—, —CY1=CY2- or —C≡C—, specifically in such a way that oxygen and/or sulfur atoms are not bonded directly to one another, and are likewise optionally replaced by aryl or heteroaryl preferably containing 1 to 30 carbon atoms (terminal CH3 groups are understood like CH2 groups in the sense of CH2-H, R° and R°°=alkyl)

c) a filler comprising alumina flakes.

General group definition: within the description and the claims, general groups, for example alkyl, alkoxy, aryl, etc., are claimed and described. Unless stated otherwise, preference is given to using the following groups among the groups described in general terms in the context of the present invention:

alkyl: linear and branched C1-C8-alkyls,
long-chain alkyls: linear and branched C5-C20-alkyls
alkenyl: C2-C6-alkenyl; cycloalkyl: C3-C8-cycloalkyl;
alkylene: selected from the group comprising methylene; 1,1-ethylene; 1,2-ethylene; 1,1-propylidene; 1,2-propylene; 1,3-propylene; 2,2-propylidene; butan-2-ol-1,4-diyl; propan-2-ol-1,3-diyl; 1,4-butylene; cyclohexane-1,1-diyl; cyclohexane-1,2-diyl; cyclohexane-1,3-diyl; cyclohexane-1,4-diyl; cyclopentane-1,1-diyl; cyclopentane-1,2-diyl; and cyclopentane-1,3-diyl, vinyl, cyanoethyl, undecyl, hydroxymethyl
aryl: selected from aromatics with a molecular weight below 300 Da
haloalkyl: selected from the group comprising mono-, di-, tri-, poly- and perhalogenated linear and branched C1-C8-alkyl.

Unless defined differently, the following groups are more preferred groups among the general group definitions:
alkyl: linear and branched C1-C6-alkyl, especially methyl, ethyl, propyl, isopropyl;
aryl: selected from the group comprising: phenyl; biphenyl; naphthalenyl; anthracenyl; phenanthrenyl, benzyl.

It has been found that, surprisingly, in the presence of the two components, a kind of synergistic effect in many applications of the present invention makes it possible to obtain insulating resins which have a greatly increased glass transition temperature compared to the existing solutions with, at the same time, very high other properties such as tracking resistance or burst value.

In the context of the present invention, the term "insulating resin" comprises and/or includes especially a (preferably low-viscosity) casting resin system based on epoxy resin and anhydride component with controlled reactivity.

In the context of the present invention, the term "switchgear" comprises and/or includes especially assemblies for low, moderate and high voltage.

In the context of the present invention, the term "based on glycidyl esters" comprises and/or includes especially the fact that glycidyl ester resin is used as one starting component—especially main component. It is possible to use all resins known in the prior art.

In the context of the present invention, the term "formed from the starting component(s)" means and/or comprises especially the fact that the insulating resin is produced from this/these component(s).

In the context of the present invention, the term "methylnadic anhydride" means and/or comprises especially the following compound:

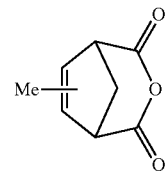

In the context of the present invention, the term "alumina" means and/or comprises especially a material which consists to an extent of ≧95% (% by weight), preferably ≧98% and most preferably of ≧99% of alumina.

In a preferred embodiment of the present invention, the ratio of material a) to material b) (in weight/weight) is from ≧50:1 to ≦300:1. This has been found to be advantageous in practice since the glass transition temperature can thus often be increased once again.

The ratio of material a) to material b) (in weight/weight) is preferably from ≧100:1 to ≦250:1, more preferably ≧150:1 to ≦220:1.

In a preferred embodiment of the present invention, the proportion of material a) in the resin (in weight/weight based on glycidyl esters) is from ≧0.8:1 to ≦1:1. This too has often been found to be advantageous for the increase in the glass transition temperature.

The ratio of material a) to material b) in the resin (in weight/weight based on glycidyl esters) is preferably from ≧0.85:1 to ≦0.98:1, more preferably ≧0.92 to ≦0.97:1.

In a preferred embodiment of the present invention, the proportion of material b) in the resin (in weight/weight based on glycidyl esters) is from ≧0.01:1 to ≦0.1:1, more preferably ≧0.02:1 to ≦0.09:1 and most preferably 0.04:1 to ≦0.07:1.

In a preferred embodiment of the present invention, component b) is selected from the group comprising 1-methylimidazole, 1-ethylimidazole, 1-propylimidazole, 1-isopropylimidazole, 1,2-dimethylimidazole, 2-ethyl-4-ethylimidazole, imidazole, 1-benzyl-2-phenylimidazole, 1-vinylimidazole, 2-methylimidazole, 2-heptadecylimidazole, and mixtures thereof.

In a preferred embodiment of the present invention, the proportion of the filler c) in the resin (in weight/weight of the overall mixture) is from ≧50% to ≦100%. Preference is given to ≧65%, more preference to ≦70%.

In a preferred embodiment of the present invention, the $d_{50}$ of the filler c) is from ≧2 μm to ≦6 μm.

This has been found to be useful in practice, since the burst resistance can thus often be increased once again. More preferred is ≧3 μm to ≦5 μm.

In a preferred embodiment of the present invention, the insulating resin is produced in a curing process comprising a curing step at ≧140° C., preferably ≦150° C. and a curing time of ≧12 h, preferably ≧14 h and most preferably ≧16 h.

The potting operation is preferably under reduced pressure.

The present invention also relates to an insulating part comprising an insulating resin according to the present invention. The insulating part is preferably part of a GIL system.

The present invention also relates to the use of a resin system based on glycidyl esters, formed from the starting components comprising:
a) a material comprising methylnadic anhydride and/or hydrogenated methylnadic anhydride,
b) a material comprising an imidazole of the following structure:

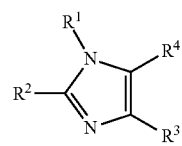

I where R1 is selected from the group comprising alkyl, longchain alkyl, alkenyl, cycloalkyl, haloalkyl, aryl;
$R^2$, $R^3$, $R^4$ are each independently selected from the group comprising hydrogen, alkyl, long-chain alkyl, alkenyl, cycloalkyl, haloalkyl, aryl, where one or more nonadjacent CH2 groups in suitable radicals may each independently be replaced by —O—, —S—, —NH—, —NR°—, —SiR°R°°—, —CO—, —COO—, —OCO—, —OCO—O—, —SO2-, —S—CO—, —CO—S—, —CY1=CY2- or —C≡C—, specifically in such a way that oxygen and/or sulfur atoms are not bonded directly to one another, and are likewise optionally replaced by aryl or heteroaryl preferably containing 1 to 30 carbon atoms (terminal CH3 groups are understood like CH2 groups in the sense of CH2-H, R° and R°°=alkyl)
c) a filler comprising alumina flakes
as an insulating system for switchgear.

The aforementioned components, and those claimed and those to be used in accordance with the invention which are described in the working examples, are not subject to any particular exceptional conditions in their size, shape configuration, material selection and technical design, and so the selection criteria known in the field of use can be applied without restriction.

Further details, features and advantages of the subject matter of the invention are evident from the dependent claims, and from the description of the accompanying examples which follows.

EXAMPLE I

The present invention is—in a purely illustrative and non-restrictive manner—examined using the present inventive example I. This involved producing a resin formed from the following components:

| Component | Rel. proportion by weight |
|---|---|
| glycidyl ester resin | 100 |
| methylnadic anhydride | 95 |
| 1-methylimidazole | 0.5 |
| alumina flakes, $d_{50}$ = 4 μm | 70 |
| | (based on the overall mixture) |

The resin was cured at 80° C. for 2 h, then at 100° C. for 2 h, subsequently at 130° C. for 1 h and finally at 150° C. for 16 h.

In addition, three (noninventive) comparative resins were prepared.

COMPARATIVE EXAMPLE I

In comparative example I, the filler used was dolomite with a $d_{50}$ of 21 μm instead of alumina. The preparation conditions were otherwise the same.

COMPARATIVE EXAMPLE II

In comparative example II, the filler used was alumina beads with a $d_{50}$ of 5 μm instead of alumina flakes. The preparation conditions were otherwise the same.

COMPARATIVE EXAMPLE III

In comparative example III, the filler used was high-grade corundum with a $d_{50}$ of 4 μm instead of alumina flakes. The preparation conditions were otherwise the same.

In a test, firstly, the tensile strength [ISO 527-4], the Martens temperature and the burst value (pressure test with water) were determined.

| Resin | Tensile strength | Martens (° C.) | Burst value |
|---|---|---|---|
| Comparative example I | 50 N/mm² | 139 | missed target value |
| Comparative example II | 50 N/mm² | 140 | missed target value |
| Comparative example III | 70 N/mm² | 140 | hit target value |
| Example I | 80 N/mm² | 150 | hit target value |

The inventive resin system thus has the highest tensile strength, the highest Martens temperature and meets (with comparative example III) the burst value requirements.

The tracking characteristics of all resin systems were likewise studied; all resins were found to be adequate.

In addition, stability to decomposition products of $SF_6$ [storage over 3 months in highly decomposed $SF_6$] was found. Here, good stabilities were found only for comparative example I and example I. For the rest of the variants, the stability was reduced, in some cases considerably.

The advantageous properties of the inventive insulating resin are thus seen, it being the only one to meet all requirements.

The invention claimed is:

1. An insulating resin for insulating compositions in switchgear formed from the starting components comprising:
   a) a material containing at least one anhydride selected form the group consisting of a mixture of methyl isomers of methylbicyclo[2.2.1]hept-5-ene-2,3-dicarboxylic anhydride and hydrogenated mixture of methyl isomers of methylbicyclo[2.2.1]hept-5-ene-2,3-dicarboxylic anhydride,
   b) a material containing an imidazole of the following structure:

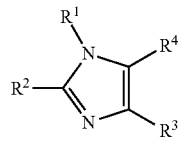

where R1 is selected from the group consisting of alkyl, long-chain alkyl, alkenyl, cycloalkyl, haloalkyl, aryl;
   $R^2, R^3, R^4$ are each independently selected from the group consisting of hydrogen, alkyl, long-chain alkyl, alkenyl, cycloalkyl, haloalkyl, and aryl;
   where one or more nonadjacent CH2 groups in suitable radicals may each independently be replaced by —O—, —S—, —NH—, —NR°—, —SiR°R°°—, —CO—, —COO—, —OCO—, —OCO—O—, —SO2-, —S—CO—, —CO—S—, —CY1=CY2- or —C≡C—, such that oxygen and/or sulfur atoms are not bonded directly to one another, and are likewise optionally replaced by aryl or heteroaryl preferably containing 1 to 30 carbon atoms, with terminal CH3 groups being understood as CH2 groups in a sense of CH2-H, where R° and R°°=alkyl; and
   c) a filler comprising alumina flakes;
   d) a resin based on glycidyl esters:
said components formed into said resin, wherein a ratio of material a) to material b), in weight:weight, lies between ≧50:1 and ≦300:1 and a proportion of material a) in the resin based on glycidyl esters, in weight:weight is from ≧0.8:1 to ≦1:1.

2. The insulating resin according to claim 1, wherein a proportion of material b) in the resin, in weight:weight based on glycidyl esters, is from ≧01:1 to ≦0.1:1.

3. The insulating resin according to claim 1, wherein said component b) is selected from the group consisting of 1-methylimidazole, 1-ethylimidazole, 1-propylimidazole, 1-isopropylimidazole, imidazole, 2-methylimidazole, 1,2-dimethylimidazole, 2-ethyl-4-ethylimidazole, imidazole, 1-benzyl-2-phenylimidazole, 1-vinylimidazole, 2-methylimidazole, 2-heptadecyl-imidazole, 2-phenylimidazole, and mixtures thereof.

4. The insulating resin according to claim 1, wherein a $d_{50}$ diameter of said alumina flakes in filler c) is from ≧2 μm to ≦6 μm.

5. An insulating component, comprising an insulating resin according to claim 1.

6. The insulating component according to claim 5, configured as an insulating part of a gas-insulated transmission line system.

7. A method of insulating electrical switchgear which comprises providing the switchgear with an insulating composition, and forming the resin system from the following starting components:
   a) a material containing at least one anhydride selected form the group consisting of a mixture of methyl isomers of methylbicyclo[2.2.1]hept-5-ene-2,3-dicarboxylic anhydride and hydrogenated mixture of methyl isomers of methylbicyclo[2.2.1]hept-5-ene-2,3-dicarboxylic anhydride,
   b) a material containing an imidazole of the following structure:

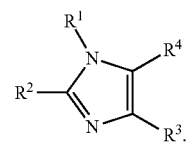

where R1 is selected from the group consisting of alkyl, long-chain alkyl, alkenyl, cycloalkyl, haloalkyl, aryl;
   $R^2, R^3, R^4$ are each independently selected from the group consisting of hydrogen, alkyl, long-chain alkyl, alkenyl, cycloalkyl, haloalkyl, and aryl;
   where one or more nonadjacent CH2 groups in suitable radicals may each independently be replaced by —O—, —S—, —NH—, —NR°—, —SiR°R°°—, —CO—, —COO—, —OCO—, —OCO—O—, —SO2-, —S—CO—, —CO—S—, —CY1=CY2- or —C≡C—, such that oxygen and/or sulfur atoms are not bonded directly to one another, and are likewise optionally replaced by aryl or heteroaryl preferably containing 1 to 30 carbon atoms, with terminal CH3 groups being understood as CH2 groups in a sense of CH2-H, where R° and R°°=alkyl; and
   c) a filler comprising alumina flakes;
   d) a resin based on glycidyl esters
said components formed into said resin, wherein said resin is based on glycidyl esters, wherein a ratio of material a) to material b), in weight:weight, lies between ≧50:1 and ≦300:1 and a proportion of material a) in the resin based on glycidyl esters, in weight:weight is from ≧0.8:1 to ≦1:1.

8. The insulating resin according to claim 1, wherein said resin has a tensile strength of about 80 N/mm² and a Martens temperature of 150° C.

9. The method of claim 7 further including the step of imparting a tensile strength of about 80 N/mm² and a Martens temperature of 150° C. to said resultant resin.

* * * * *

UNITED STATES PATENT AND TRADEMARK OFFICE
CERTIFICATE OF CORRECTION

PATENT NO.      : 8,349,937 B2
APPLICATION NO. : 13/148721
DATED           : January 8, 2013
INVENTOR(S)     : Gernot Swiatkowski It is certified that error appears in the above-identified patent and that said Letters Patent is hereby corrected as shown below:

<u>Column 5,</u>

Line 28, "form the group consisting" should read -- from the group consisting --

<u>Column 6,</u>

Line 4, "imidazole, 2-methylimidazole, 1,2-dimethylimidazole, 2-ethyl-4-ethylimidazole,"
should read -- 2-methylimidazole, 1,2-dimethylimidazole, 2-ethyl-4-ethylimidazole, --

Line 5, "imidazole, 1-benzyl-2-phenylimidazole, 1-vinylimidazole, 2-methylimidazole,"
should read -- 1-benzyl-2-phenylimidazole, 1-vinylimidazole, 2-methylimidazole, --

Line 21, "form the group consisting" should read -- from the group consisting --

Signed and Sealed this
Twelfth Day of March, 2013

Teresa Stanek Rea
*Acting Director of the United States Patent and Trademark Office*